United States Patent
Zhang et al.

(10) Patent No.: US 10,897,333 B2
(45) Date of Patent: Jan. 19, 2021

(54) METHOD FOR REPORTING CHANNEL STATE INFORMATION, USER EQUIPMENT AND BASE STATION

(71) Applicant: FUJITSU LIMITED, Kawasaki (JP)

(72) Inventors: Yi Zhang, Beijing (CN); Yi Wang, Beijing (CN); Yuantao Zhang, Beijing (CN); Hua Zhou, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/175,118

(22) Filed: Feb. 7, 2014

(65) Prior Publication Data

US 2014/0153432 A1 Jun. 5, 2014

Related U.S. Application Data

(63) Continuation of application No. PCT/CN2011/078200, filed on Aug. 10, 2011.

(51) Int. Cl.
| | | |
|---|---|---|
| *H04L 5/00* | (2006.01) | |
| *H04L 1/00* | (2006.01) | |
| *H04B 7/06* | (2006.01) | |
| *H04B 17/24* | (2015.01) | |
| *H04B 17/309* | (2015.01) | |

(Continued)

(52) U.S. Cl.
CPC ......... *H04L 5/0035* (2013.01); *H04B 7/0626* (2013.01); *H04B 7/0647* (2013.01); *H04B 17/24* (2015.01); *H04B 17/309* (2015.01); *H04B 17/373* (2015.01); *H04L 1/0026* (2013.01); *H04L 1/0027* (2013.01);

(Continued)

(58) Field of Classification Search
CPC .... H04W 24/10; H04L 1/0026; H04L 1/0027; H04L 5/0035; H04B 7/0647; H04B 7/0626; H04B 17/309; H04B 17/373
See application file for complete search history.

(56) References Cited

U.S. PATENT DOCUMENTS

| | | | |
|---|---|---|---|
| 9,325,475 B2 | 4/2016 | Hoshino et al. | |
| 9,629,137 B2 * | 4/2017 | Kim | H04W 72/0413 |

(Continued)

FOREIGN PATENT DOCUMENTS

| | | |
|---|---|---|
| CN | 101635950 | 1/2010 |
| CN | 101917259 | 12/2010 |

(Continued)

OTHER PUBLICATIONS

Notice of Preliminary Rejection issued for corresponding Korean Patent Application No. 10-2014-7004134, dated Mar. 20, 2015, with English translation.

(Continued)

*Primary Examiner* — Kan Yuen
(74) *Attorney, Agent, or Firm* — Myers Wolin, LLC (57) ABSTRACT

A method for reporting channel state information, user equipment and base station. Including receiving, by user equipment, an indication signaling transmitted by a base station, the indication signaling comprising identification information for triggering report of aperiodic channel state information; determining a measurement set of the report of the aperiodic channel state information according to the identification information; and reporting corresponding channel state information to the base station according to the measurement set.

12 Claims, 7 Drawing Sheets

(51) Int. Cl.
    *H04B 17/373*     (2015.01)
    *H04W 24/10*      (2009.01)
    *H04L 25/02*      (2006.01)
(52) U.S. Cl.
    CPC ........... *H04L 5/0094* (2013.01); *H04W 24/10* (2013.01); *H04L 25/0204* (2013.01)

(56) References Cited

U.S. PATENT DOCUMENTS

| | | | |
|---|---|---|---|
| 2009/0168718 | A1 | 7/2009 | Wang et al. |
| 2012/0208547 | A1* | 8/2012 | Geirhofer ............ H04B 7/0626 455/452.2 |
| 2013/0039197 | A1 | 2/2013 | Pan et al. |
| 2013/0142163 | A1* | 6/2013 | Liu ...................... H04L 1/0026 370/329 |
| 2013/0294352 | A1* | 11/2013 | Park et al. .................... 370/328 |
| 2014/0153432 | A1 | 6/2014 | Zhang et al. |
| 2017/0026159 | A1 | 1/2017 | Kim et al. |

FOREIGN PATENT DOCUMENTS

| | | |
|---|---|---|
| CN | 101931989 | 12/2010 |
| CN | 102006624 | 4/2011 |
| CN | 102082625 A | 6/2011 |
| CN | 102291223 | 12/2011 |
| EP | 2 741 440 A1 | 6/2014 |
| EP | 2 744 138 A1 | 6/2014 |
| KR | 10-2010-0100644 A | 9/2010 |
| KR | 10-2014-0036137 A | 3/2014 |
| WO | 2010/149038 A1 | 12/2010 |
| WO | 2011/094633 A2 | 8/2011 |
| WO | 2012/022103 A1 | 2/2012 |
| WO | 2012/105793 A2 | 8/2012 |
| WO | 2012/105793 A3 | 8/2012 |
| WO | 2013/020278 A1 | 2/2013 |
| WO | 2013/021556 A1 | 2/2013 |

OTHER PUBLICATIONS

International search report issued for corresponding international application No. PCT/CN2011/078200, dated May 17, 2012.
Office Action issued for corresponding Mexican Patent Application No. Mx/a/2014/000940 dated Jan. 9, 2015 with an English translation.
Extended European search report with supplementary European search report and the European search opinion issued for corresponding European Patent Application No. 11870722.3, dated Feb. 19, 2015. issued.
Office Action and Examination Search Report issued for corresponding Canadian Patent Application No. 2,843,630, dated Mar. 27, 2015.
Office Action issued by Rospatent Federal Service for Intellectual Property for corresponding Russian Patent Application No. 2014108325/08(013190), dated Jul. 7, 2015, with an English translation.
Notice of Final Rejection issued by the Korean Intellectual Property Office for corresponding Korean Patent Application No. 10-2014-7004134, dated Oct. 21, 2015, with English translation.
Office Action issued by the Mexican Institute of Industrial Property for corresponding Mexican Patent Application No. MX/a/2014/000940, dated May 22, 2015, with an English translation.
Notice of Reason for Rejection issued by the Japan Patent Office for corresponding Japanese Patent Application No. 2014-524239, dated Aug. 11, 2015, with an English translation.
3GPP TS 36.213 V10.1.0, "3rd Generation Partnership Project; Technical Specification Group Radio Access Network; Evolved Universal Terrestrial Radio Access (E-UTRA); Physical layer procedures (Release 10)", Mar. 2011, pp. 1-4.
Office Action dated Mar. 17, 2016 and search report dated Mar. 15, 2016 issued by the Canadian Intellectual Property Office for corresponding Canadian Patent Application No. 2,843,630.
Notice of Preliminary Rejection issued for corresponding Korean Patent Application No. 10-2016-7012776 dated Aug. 2, 2016 with English translation.
3rd Generation Partnership Project, "Technical Specification Group Radio Access Network; Evolved Universal Terrestrial Radio Access (E-UTRA); Physical layer procedures (Release 10)", TS 36.213 V10.2.0, Jun. 2011.
First Notification of Office Action issued by the State Intellectual Property Office of China for corresponding Chinese Patent Application No. 201180072152.7, dated Jan. 27, 2016, with an English translation.
Notice of Preliminary Rejection issued by the Korean Intellectual Property Office for corresponding Korean Patent Application No. 10-2014-7004134, dated Feb. 15, 2016, with English translation.
Decision for Rejection issued by the State Intellectual Property Office of China for corresponding Chinese Patent Application No. 201180072152.7, dated Feb. 7, 2017, with an English translation.
Notice of Reasons for Rejection issued for corresponding Japanese Patent Application No. 2016-077456, dated Jan. 24, 2017, with an English translation.
Second Notification of Office Action issued by the State Intellectual Property Office of China for corresponding Chinese Patent Application No. 201180072152.7, dated Sep. 26, 2016, with an English translation.
Notice of Preliminary Rejection issued by the Korean Intellectual Property Office for corresponding Korean Patent Application No. 10-2016-7013348, dated Mar. 14, 2017, with English translation.
Notice of Final Rejection issued by the Korean Intellectual Property Office for corresponding Korean Patent Application No. 10-2016-7012776, dated Apr. 6, 2017, with English translation.
Communication pursuant to Article 94(3) EPC issued by the European Patent Office for corresponding European Patent Application No. 11 870 722.3-1874, dated Oct. 20, 2017.
Decision on Appeal issued by the Korean Intellectual Property Office for corresponding Korean Patent Application No. 10-2014-7004134, mailed on Jan. 16, 2018, with English summary translation.
Notification of Reasons for Refusal issued for corresponding Japanese Patent Application No. 2017-094473, dated May 22, 2018, with an English translation.
Notice of Preliminary Rejection issued for corresponding Korean Patent Application No. 10-2017-7018617, dated Mar. 26, 2018, with an English translation.
3GPP TS 36331 V10.2.0, "3rd Generation Partnership Project; Technical Specification Group Radio Access Network; Evolved Universal Terrestrial Radio Access (E-UTRA); Radio Resource Control (RRC); Protocol specification (Release 10)", Jun. 2011.
First Office Action issued by Intellectual Property India for corresponding Indian Patent Application No. 130/KOLNP/2014, dated Dec. 4, 2018, with an English translation.

\* cited by examiner

METHOD FOR REPORTING CHANNEL STATE INFORMATION, USER EQUIPMENT AND BASE STATION

CROSS-REFERENCE TO RELATED APPLICATIONS

This is a continuation of International Application No. PCT/CN2011/078200, filed on Aug. 10, 2011, now pending, the contents of which are herein wholly incorporated by reference.

TECHNICAL FIELD

The present invention relates to the field of communications, and in particular to a method for reporting channel state information, user equipment and a base station.

BACKGROUND

Coordinated multiple points (CoMP) technology coordinates with user equipment in transmitting data by using multiple transmission points, thereby enhancing performance of cell-edge users, improving coverage of a cell, and increasing throughput of the cell edge and throughput of a system.

Figure 1:
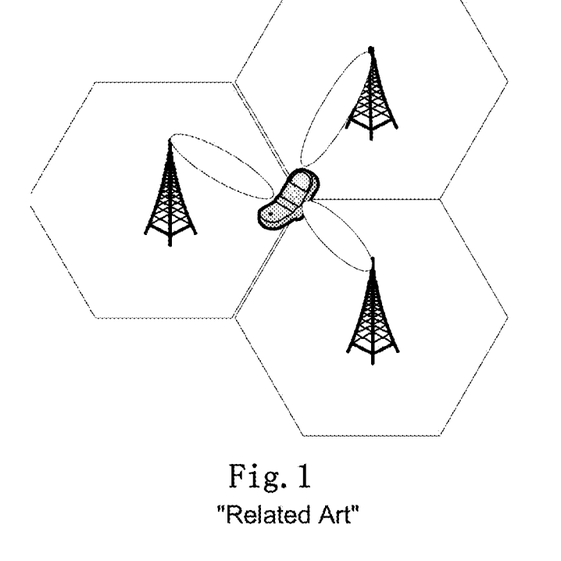
FIG. 1 is a schematic diagram of a CoMP scheme in the relevant art.

FIG. 1 is a schematic diagram of a CoMP scheme in the relevant art. As shown in FIG. 1, multiple transmission points coordinate to provide services for user equipment. The conventional CoMP scheme includes joint processing (JP) and coordination scheduling/beamforming (CS/CB); wherein, for the JP scheme, multiple transmission points transmit identical data to a mobile station, which enhances reliability of the data transmission; and for the CS/CB scheme, multiple transmission points transmit data to users in respective serving areas of themselves, which makes the transmission points transmit data in an orthogonal space according to the coordination between the transmission points.

In order to further improve capacity of the system, a heterogeneous network is introduced into a long-term evolution-advanced (LTE-A) scheme of a wireless communication system of next generation. The LTE-A system includes a macro cell, a femto cell, a pico cell, a remote radio head (RRH) and a relay.

Figure 2:
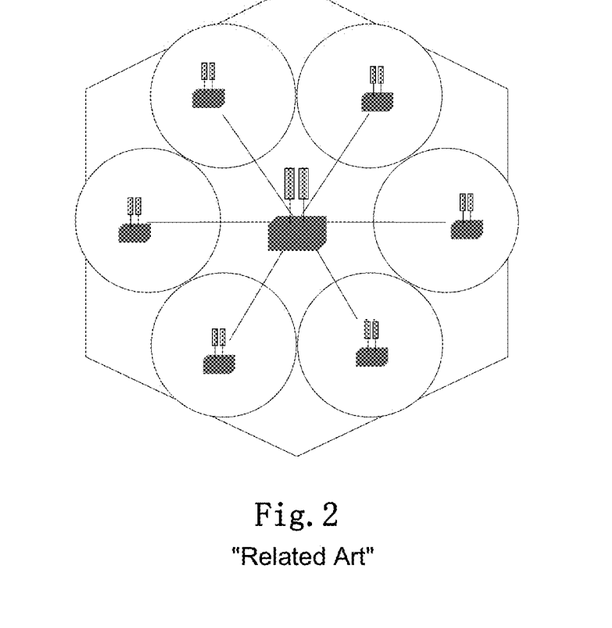
FIG. 2 is a schematic diagram of the deployment of a CoMP transmission cell in a heterogeneous network consisting of a macro cell and RRHs.

FIG. 2 is a schematic diagram of deployment of a CoMP transmission cell in a heterogeneous network including a macro cell and RRHs. The cell may be deployed in two ways. The first one is that the macro cell and the RRHs use identical cell ID; in such a scenario, the macro cell and the RRHs use an identical physical downlink control channel (PDCCH), a physical control format indication channel (PCFICH), a physical broadcast channel (PBCH), a primary synchronization signal (PSS), a secondary synchronization signal (SSS), a system information block (SIB) channel and a common reference signal (CRS), but a physical downlink shared channel (PDSCH) may be multiplexed by using the CoMP transmission mode. The second one is that the macro cell and the RRHs use different cell IDs; in such a scenario, the macro cell and the RRHs multiplex a PDCCH, a PDSCH, a physical hybrid ARQ indicator channel (PHICH), a PCFICH, a PBCH, a PSS, an SSS, an SIB channel and a CRS.

Currently, a user equipment side performs radio resource management (RRM) measurement, and reports a result of the measurement to a base station. The base station determines a measurement set of a mobile station according to a result of the RRM measurement reported by the mobile station and other auxiliary information (such as SRS measurement information). A base station side configures a user with a measurement set by using a high-layer signaling, and the base station measures corresponding channel quality information according to the configured measurement set. Such a configured measurement set may include a coordinated macro cell and RRHs, and the base station side selects transmission points participating in the CoMP coordination according to the results of the measurement and performs corresponding scheduling.

However, in the implementation of the present invention, the inventors found that defects exist in the relevant art: in order to acquire channel station information of each transmission point, the user equipment side needs to report information on all of the transmission points in the measurement sets configured by the base station side, which is relatively high in feedback overhead. In some cases, the base station side needs the channel station information of only part of the transmission points, which may be performed by aperiodic report.

A conventional aperiodic report is triggered via downlink control information (DCI) format 0 or by setting a channel quality indicator (CQI) request domain to be 1. In the CoMP transmission mode, the channel state information needing to be fed back may include channel state information of multiple transmission points. In order to obtain better compromise between feedback overhead and system performance, multiple aperiodic report scenarios may occur. For example, channel state information of the macro base station is only fed back, or channel state information of all the coordinated transmission points is fed back, or channel state information of a certain needed transmission point is fed back. Therefore, the existing aperiodic report scheme of channel state information is not flexible enough, and a new signaling design is needed to trigger aperiodic report of channel state information.

It should be noted that the above description of the background art is merely provided for clear and complete explanation of the present invention and for easy understanding by those skilled in the art. And it should not be understood that the above technical solution is known to those skilled in the art as it is described in the background art of the present invention.

SUMMARY

Embodiments of the present invention provide a method for reporting channel state information, user equipment and a base station, to improve the flexibility of an aperiodic report scheme of channel state information.

According to one aspect of the embodiments of the present invention, there is provided a method for reporting channel state information, including:

receiving, by user equipment, an indication signaling transmitted by a base station, the indication signaling including identification information for triggering report of aperiodic channel state information;

determining a measurement set to which the report of the aperiodic channel state information corresponds according to the identification information, the measurement set including information on one or more transmission points of the user equipment; and reporting corresponding channel state information to the base station according to the measurement set.

According to another aspect of the embodiments of the present invention, there is provided a method for reporting channel state information, including:

transmitting, by a base station, an indication signaling to user equipment, the indication signaling including identification information for triggering report of aperiodic channel state information; and receiving channel state information reported by the user equipment, the channel state information being obtained by the user equipment according to a measurement set determined on the basis of the identification information.

According to still another aspect of the embodiments of the present invention, there is provided user equipment, including:

a signaling receiver, configured to receive an indication signaling transmitted by a base station, the indication signaling including identification information for triggering report of aperiodic channel state information;

a measurement set determiner, configured to determine a measurement set to which the report of the aperiodic channel state information corresponds according to the identification information, the measurement set including information on one or more transmission points of the user equipment; and an information reporter, configured to report corresponding channel state information to the base station according to the measurement set.

According to further still another aspect of the embodiments of the present invention, there is provided a base station, including:

a signaling transmitter, configured to transmit an indication signaling to user equipment, the indication signaling including identification information for triggering report of aperiodic channel state information; and an information receiver, configured to receive channel state information reported by the user equipment, the channel state information being obtained by the user equipment according to a measurement set determined on the basis of the identification information.

According to further still another aspect of the embodiments of the present invention, there is provided a computer-readable program, wherein when the program is executed in user equipment, the program enables a computer to carry out the method for reporting channel state information as described above in the user equipment.

According to further still another aspect of the embodiments of the present invention, there is provided a storage medium in which a computer-readable program is stored, wherein the computer-readable program enables a computer to carry out the method for reporting channel state information as described above in user equipment.

According to further still another aspect of the embodiments of the present invention, there is provided a computer-readable program, wherein when the program is executed in a base station, the program enables a computer to carry out the method for reporting channel state information as described above in the base station.

According to further still another aspect of the embodiments of the present invention, there is provided a storage medium in which a computer-readable program is stored, wherein the computer-readable program enables a computer to carry out the method for reporting channel state information as described above in a base station.

The advantage of the embodiments of the present invention resides in that: needed aperiodic channel state information may be quickly fed back by using an indication signaling for triggering report of aperiodic channel state information, thereby achieving relatively flexible aperiodic report.

With reference to the following description and drawings, the particular embodiments of the present invention are disclosed in detail, and the principle of the present invention and the manners of use are indicated. It should be understood that the scope of the embodiments of the present invention is not limited thereto. The embodiments of the present invention contain many alternations, modifications and equivalents within the spirits and scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising" when used in this specification is taken to specify the presence of stated features, integers, steps or components but does not preclude the presence or addition of one or more other features, integers, steps, components or groups thereof.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. To facilitate illustrating and describing some parts of the invention, corresponding portions of the drawings may be exaggerated or reduced in size.

Elements and features depicted in one drawing or embodiment of the invention may be combined with elements and features depicted in one or more additional drawings or embodiments. Moreover, in the drawings, like reference numerals designate corresponding parts throughout the several views and may be used to designate like or similar parts in more than one embodiment.

DETAILED DESCRIPTION

These and further aspects and features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the appended claims.

Embodiment 1

Figure 3:
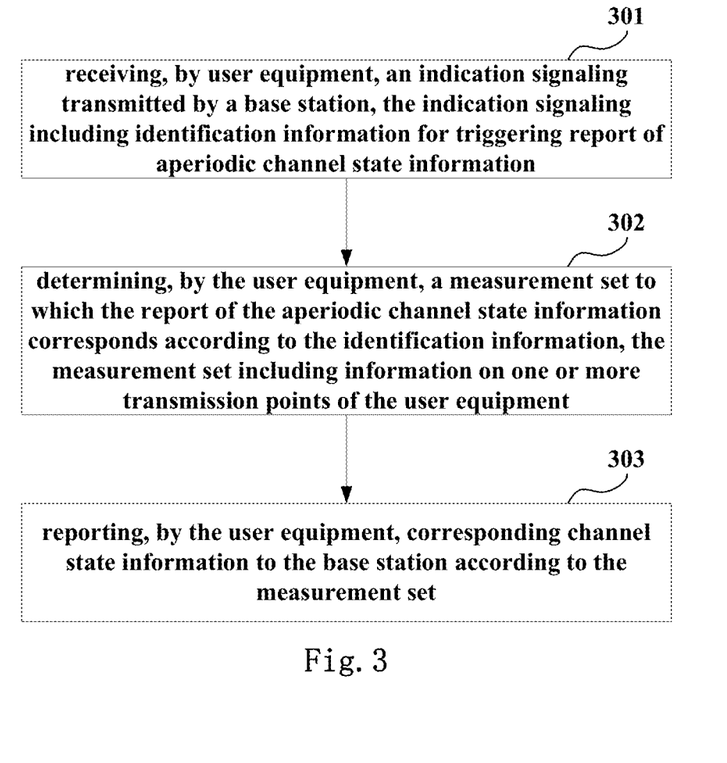
FIG. 3 is a flowchart of a method for reporting of an embodiment of the present invention.

An embodiment of the present invention provides a method for reporting channel state information, and FIG. 3 is a flowchart of the method for reporting of an embodiment of the present invention. As shown in FIG. 3, at a user equipment side, the method includes:

step 301: receiving, by user equipment, an indication signaling transmitted by a base station, the indication signaling including identification information for triggering report of aperiodic channel state information;

step 302: determining, by the user equipment, a measurement set to which the report of the aperiodic channel state information corresponds according to the identification information, the measurement set including information on one or more transmission points of the user equipment; and step 303: reporting, by the user equipment, corresponding channel state information to the base station according to the measurement set.

In this embodiment, the base station may transmit an indication signaling to the user equipment, the indication signaling being used for triggering report of aperiodic channel state information, which may include indication information. And a triggering manner using a DCI signaling, such as a signaling of 1 bit, 2 bits, or even a high-bit signaling of 3 bits, or 4 bits, may be used for triggering.

In particular implementation, the indication information may be 1 bit. The existing triggering mechanism for aperiodic report may be reused if 1 bit is used, thereby needing not to change a protocol, and lowering the cost. Table 1 shows design of aperiodic report of a triggering signaling when 1 bit is used in the embodiment of the present invention.

TABLE 1

| Values of request domain of aperiodic CSI report | Description |
| --- | --- |
| '0' | Aperiodic CSI report is not triggered |
| '1' | Aperiodic CSI report of a set 1 is triggered | wherein, the set 1 in Table 1 may be configured via a high-layer signaling, such as a radio resource control (RRC) signaling. However, it is not limited thereto; for example, it may be preconfigured by the system, and a particular mode of implementation may be determined as actually required.

In particular implementation, the indication information may be 2 bits. Table 2 shows design of aperiodic report of a triggering signaling when 2 bits are used in the embodiment of the present invention.

TABLE 2

| Values of request domain of aperiodic CSI report | Description |
| --- | --- |
| '00' | Aperiodic CSI report is not triggered |
| '01' | Aperiodic CSI report of a set 1 is triggered |
| '10' | Aperiodic CSI report of a set 2 is triggered |
| '11' | Aperiodic CSI report of a set 3 is triggered | wherein, the sets 1, 2 and 3 in Table 2 may be configured via the high-layer signaling, such as an RRC signaling. However, it is not limited thereto; for example, it may be preconfigured by the system, and a particular mode of implementation may be determined as actually required.

In this embodiment, a measurement set may include information of one or more transmission points of the user equipment. After receiving the indication signaling transmitted by the base station, the user equipment may determine a corresponding measurement set according to the indication information of the indication signaling.

For example, a corresponding measurement set (P1, P2) may be determined according to indication information "01"; where, P1 and P2 denote coordinated transmission points. In this way, the user equipment may report only the channel state information to which P1 and P2 correspond to the base station, thereby being applicable to a scenario where channel state information of part of the transmission points is only needed, and improving the flexibility of report. The relevant art may be used in how to measure channel state information and how to report channel state information, which shall not be described herein any further.

Figure 4:
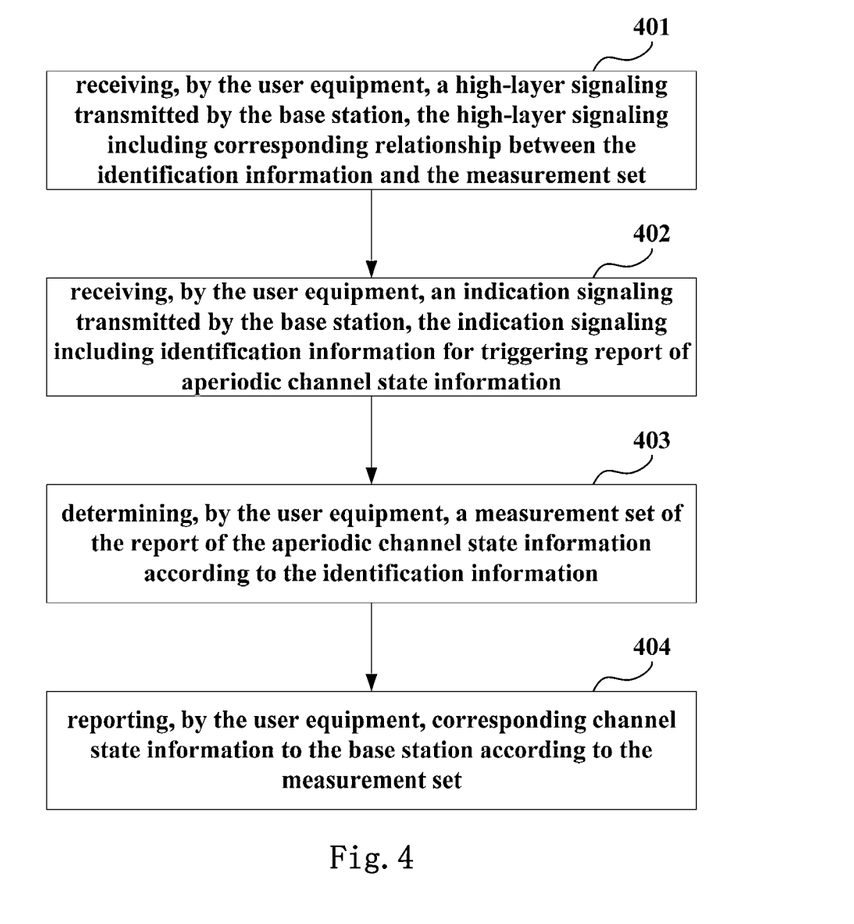
FIG. 4 is another flowchart of the method for reporting of the embodiment of the present invention.

FIG. 4 is another flowchart of the method for reporting of the embodiment of the present invention. As shown in FIG. 4, at the user equipment side, the method includes:

step 401: receiving, by the user equipment, a high-layer signaling transmitted by the base station, the high-layer signaling including corresponding relationship between the identification information and the measurement set.

in this embodiment, before the user equipment receives the indication signaling for triggering report of aperiodic channel state information transmitted by the base station, the base station may transmit the corresponding relationship between the identification information and the measurement set to the user equipment;

for example, the indication information may be 2 bits, and when three transmission points (P1, P2, P3) coordinate to transmit, an RRC signaling may be used to indicate the corresponding relationship between the identification information and the measurement set; the sets 1, 2, 3 that may be indicated may be selected from (P1), (P2), (P3), (P1, P2), (P1, P3), (P2, P3), and (P1, P2, P3). For example, the set 1 corresponds to transmission point P1, the set 2 corresponds to transmission points (P1, P2), and the set 3 corresponds to transmission points (P1, P2, P3); that is, identification information '01' corresponds to {P1}, '10' corresponds to {P1, P2}, and '11' corresponds to {P1, P2, P3};

when the aperiodic report of information needed to be changed, the RRC signaling may be transformed into other forms; for example, the set 1 corresponds to transmission points (P1, P2), the set 2 corresponds to transmission points (P2, P3), and the set 3 corresponds to transmission points (P1, P3); that is, identification information '01' corresponds to {P1, P2}, '10' corresponds to {P2, P3}, and '11' corresponds to {P1, P3};

step 402: receiving, by the user equipment, an indication signaling transmitted by the base station, the indication signaling including identification information for triggering report of aperiodic channel state information;

step 403: determining, by the user equipment, a measurement set of the report of the aperiodic channel state information according to the identification information;

in particular, the measurement set may be determined according to the identification received in step 402 and the corresponding relationship between the identification information and the measurement set obtained in step 401;

for example, if the identification information received in step 402 is '10', the corresponding measurement set may be determined as {P1, P2};

step 404: reporting, by the user equipment, corresponding channel state information to the base station according to the measurement set.

In this way, with the above signaling design method, the needed aperiodic CSI may be quickly fed back via the DCI signaling, and the configuration of the reported set may be changed via RRC, thereby achieving relatively flexible aperiodic report.

It should be noted that when the identification information is 1 bit, the signaling design described in Table 1 may be used; wherein, the CSI of the transmission points contained the set 1 is configured via a high-layer signaling. For example, the RRC signaling indicates the set 1 to be any one of (P1), (P2), (P3), (P1, P2), (P1, P3), (P2, P3), and (P1, P2, P3).

Furthermore, all the transmission points to which the user equipment corresponds may be configured into the measurement set, instead of using the high-layer signaling. For example, if the transmission points to which the user equipment corresponds are {P1, P2, P3}, the user equipment directly determines that the measurement set is {P1, P2, P3} after receiving the indication signaling containing identification information '1'.

In this embodiment, if no carrier aggregation is performed by the mobile station, the aperiodic report may be triggered by reusing the CSI request domain in the DCI format 1 or format 4 indication in the carrier aggregation; wherein, corresponding bit information description is shown in Table 3.

TABLE 3

| Values of request domain of aperiodic CSI report | Description |
| --- | --- |
| '00' | Aperiodic CSI report is not triggered |
| '01' | Aperiodic CSI report of a primary serving transmission point is triggered |
| '10' | Aperiodic CSI report of a set 1 is triggered |
| '11' | Aperiodic CSI report of a set 2 is triggered | wherein, the sets 1 and 2 may be configured via a high-layer signaling. And the primary serving transmission point may be understood as: for a CoMP scenario of different cell ID, the primary serving transmission point corresponds to the transmission point transmitting a PDCCH; and for a CoMP scenario of identical cell ID, the primary serving transmission point may be configured by the base station, such as corresponding to the transmission point closest to the mobile station.

It should be noted that the description in tables 1-3 are exemplary only, and it is not limited thereto, and a particular mode of implementation may be determined as actually required.

It can be seen from the above embodiment that with the indication signaling for triggering the report of aperiodic channel state information, the needed aperiodic CSI may be quickly fed back via the DCI signaling, and the configuration of the reported set may be changed via RRC, thereby achieving relatively flexible aperiodic report.

Figure 5:
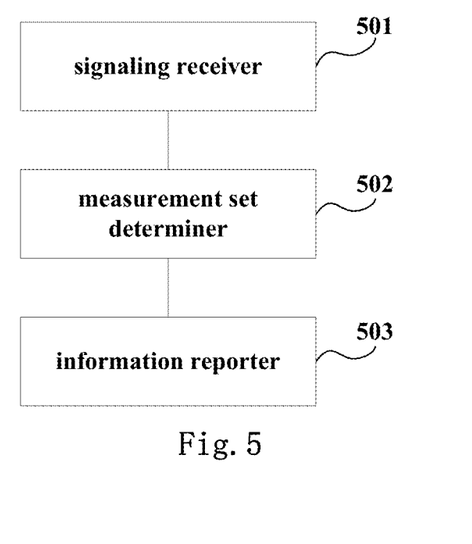
FIG. 5 is a schematic diagram of the structure of user equipment of an embodiment of the present invention.

An embodiment of the present invention further provides user equipment, and FIG. 5 is a schematic diagram of the structure of the user equipment of the embodiment of the present invention. As shown in FIG. 5, the user equipment includes a signaling receiver 501, a measurement set determiner 502 and an information reporter 503;

wherein, the signaling receiver 501 is configured to receive an indication signaling transmitted by a base station, the indication signaling including identification information for triggering report of aperiodic channel state information; the measurement set determiner 502 is configured to determine a measurement set to which the report of the aperiodic channel state information corresponds according to the identification information, the measurement set including information on one or more transmission points of the user equipment; and the information reporter 503 is configured to report corresponding channel state information to the base station according to the measurement set.

In an embodiment, the signaling receiver 501 is further configured to receive a high-layer signaling transmitted by the base station, the high-layer signaling including corresponding relationship between the identification information and the measurement set.

In particular implementation, the measurement set determiner 502 is configured to determine the measurement set according to the identification information and the corresponding relationship between the identification information and the measurement set.

In another embodiment, the identification information is 1 bit, and the measurement set determiner 502 is particularly used to configure all the transmission points to which the user equipment corresponds into the measurement set.

Figure 6:
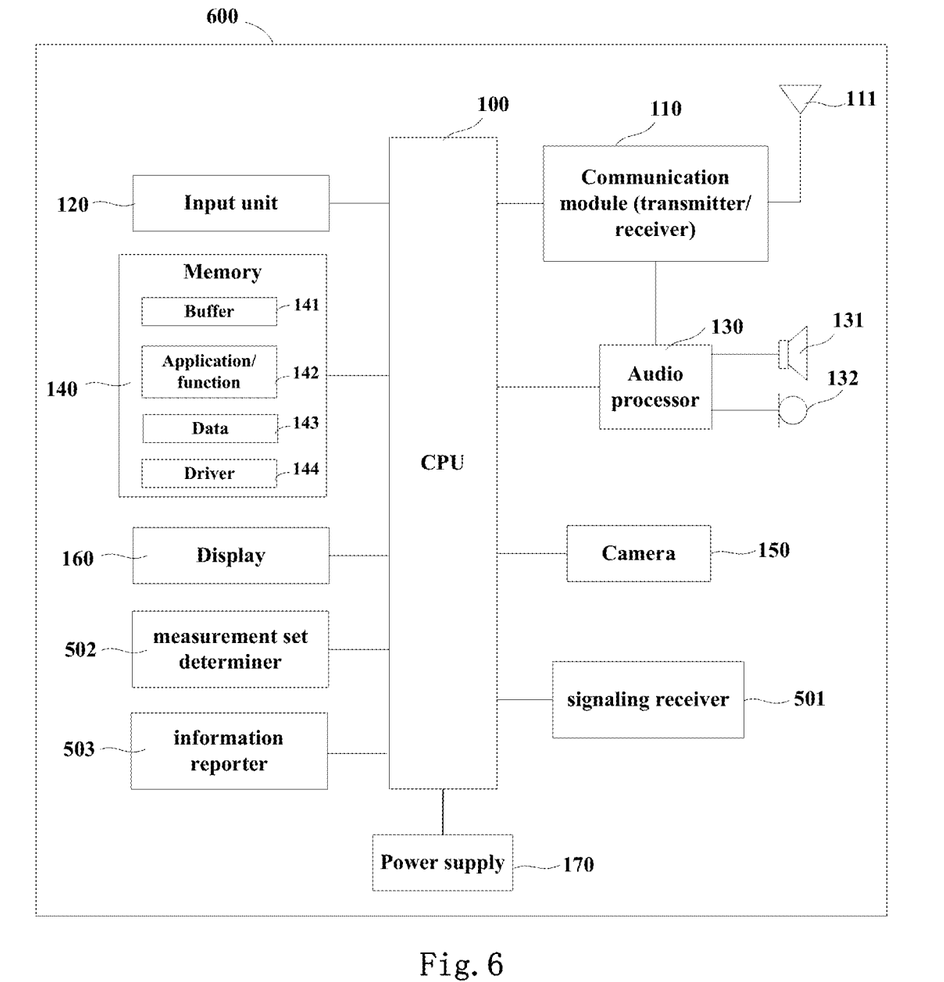
FIG. 6 is an exemplary view of the systematic structure of the user equipment of the embodiment of the present invention.

FIG. 6 is a block diagram of the systematic structure of the user equipment of the embodiment of the present invention, which includes the signaling receiver 501, the measurement set determiner 502 and the information reporter 503 as described above.

As shown in FIG. 6, the user equipment 600 may further include a CPU 100, a communication module 110, an input unit 120, an audio processing unit 130, a memory 140, a camera 150, a display 160, and a power supply 170.

It should be noted that FIG. 6 is illustrative only, and other types of structures may also be used for supplementing or replacing this structure, so as to implement the function of telecommunications or other functions.

The CPU 100 (also referred to as a controller or an operational control, which may include a microprocessor or other processing devices and/or logic devices) receives input and controls each part and operation of the electronic equipment. The input unit 120 provides input to the CPU 100. The input unit 120 may be for example a key or touch input device. The camera 150 is used to take image data and provide the taken image data to the CPU 100 for use in a conventional manner, for example, for storage, and transmission, etc.

The power supply 170 is used to supply power to the electronic equipment. And the display 160 is used to display the objects of display, such as images, and characters, etc. The display may be for example an LCD display, but it is not limited thereto.

The memory 140 is coupled to the CPU 100. The memory 140 may be a solid memory, such as a read-only memory (ROM), a random access memory (RAM), and a SIM card, etc., and may also be such a memory that stores information when the power is interrupted, and may be optionally erased and provided with more data. Examples of such a memory are sometimes referred to as an EPROM, etc. The memory 140 may also be certain other types of devices. The memory 140 includes a buffer memory 141 (sometimes referred to as a buffer). The memory 140 may include an application/function storing portion 142 used to store application programs and function programs, or to execute the flow of the operation of the user equipment via the CPU 100.

The memory 140 may further include a data storing portion 143 used to store data, such as a contact person, digital data, pictures, voices and/or any other data used by the electronic equipment. A driver storing portion 144 of the memory 140 may include various types of drivers of the user equipment for the communication function and/or for executing other functions (such as application of message transmission, and application of directory, etc.) of the user equipment.

The communication module 110 is a transmitter/receiver 110 transmitting and receiving signals via an antenna 111. The communication module (transmitter/receiver) 110 is coupled to the CPU 100 to provide input signals and receive output signals, this being similar to the case in a conventional mobile phone.

A plurality of communication modules 110 may be provided in the same user equipment for various communication technologies, such a cellular network module, a Bluetooth module, and/or wireless local network module, etc. The communication module (transmitter/receiver) 110 is also coupled to a loudspeaker 131 and a microphone 132 via the audio processing unit 130, for providing audio output via the loudspeaker 131, and receiving audio input from the microphone 132, so as to execute conventional telecommunications functions. The audio processing unit 130 may further include any suitable buffer, decoder, and amplifier, etc. Furthermore, the audio processing unit 130 is coupled to the CPU 100, so that voice recording is enabled in the native device, and the voices stored in the native device are enabled to be played via the loudspeaker 131.

Embodiment 2

Figure 7:
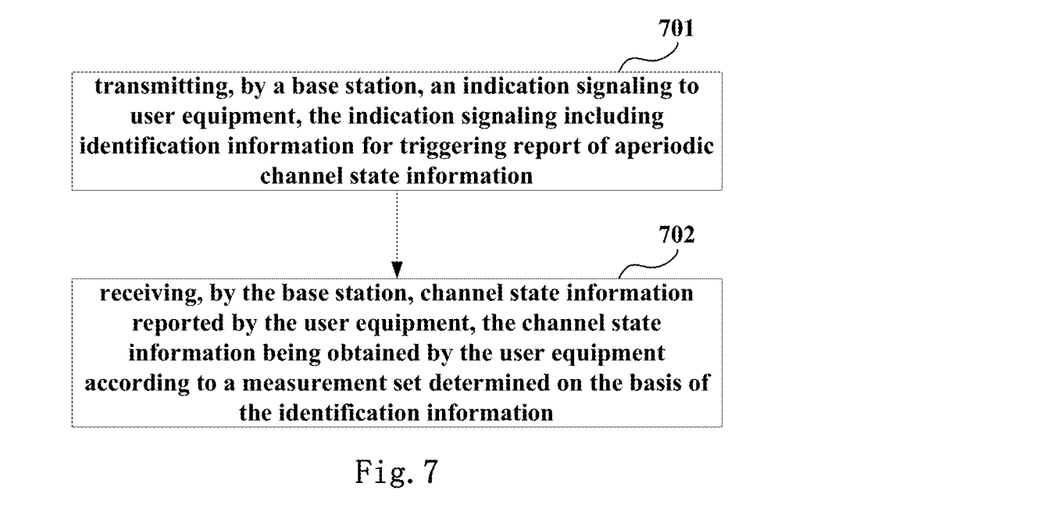
FIG. 7 is still another flowchart of the method for reporting of the embodiment of the present invention.

An embodiment of the present invention further provides a method for reporting channel state information, in which the parts identical to those in Embodiment 1 shall not be described herein any further. FIG. 7 is still another flowchart of the method for reporting of the embodiment of the present invention. As shown in FIG. 7, at a base station side, the method includes:

step 701: transmitting, by a base station, an indication signaling to user equipment, the indication signaling including identification information for triggering report of aperiodic channel state information; and step 702: receiving, by the base station, channel state information reported by the user equipment, the channel state information being obtained by the user equipment according to a measurement set determined on the basis of the identification information.

Figure 8:
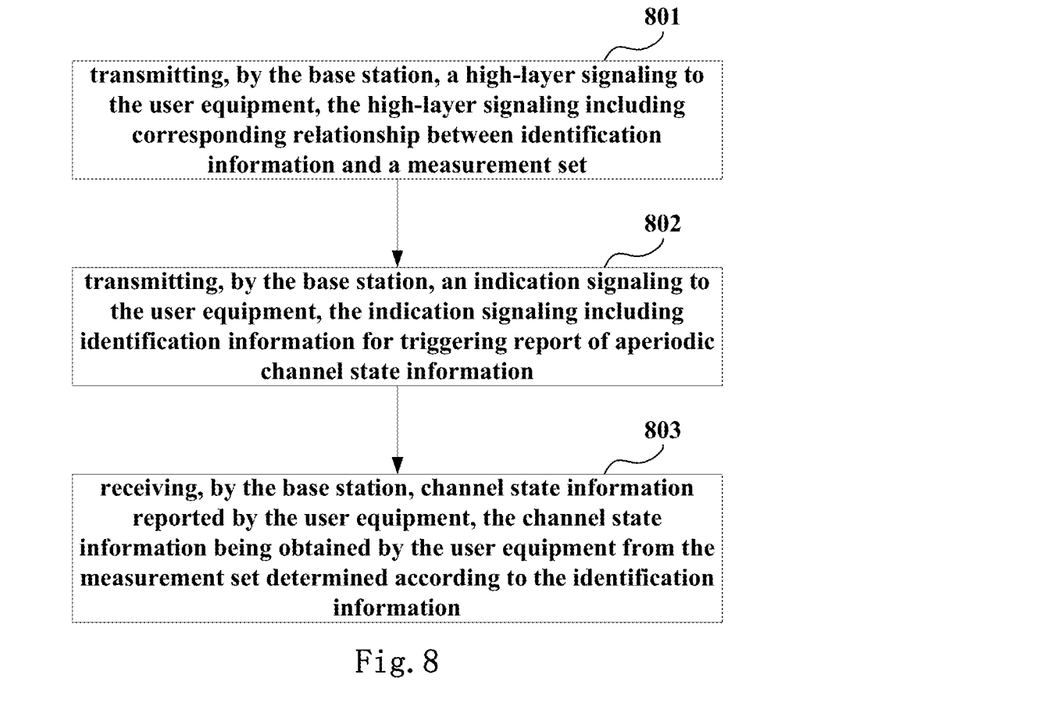
FIG. 8 is further still another flowchart of the method for reporting of the embodiment of the present invention.

FIG. 8 is further still another flowchart of the method for reporting of the embodiment of the present invention. As shown in FIG. 8, at the base station side, the method includes:

step 801: transmitting, by the base station, a high-layer signaling to the user equipment, the high-layer signaling including corresponding relationship between identification information and a measurement set;

step 802: transmitting, by the base station, an indication signaling to the user equipment, the indication signaling including identification information for triggering report of aperiodic channel state information; and step 803: receiving, by the base station, channel state information reported by the user equipment, the channel state information being obtained by the user equipment from the measurement set determined according to the identification information.

Figure 9:
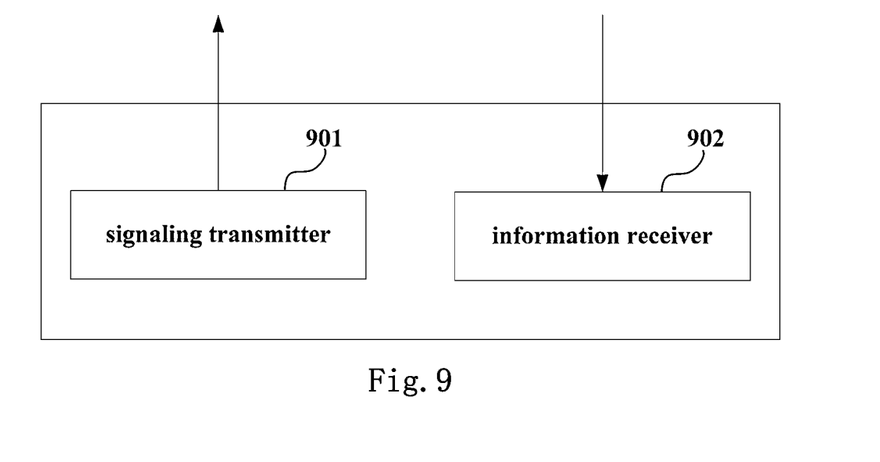
FIG. 9 is a schematic diagram of the structure of a base station of an embodiment of the present invention.

An embodiment of the present invention further provides a base station, and FIG. 9 is a schematic diagram of the structure of the base station of the embodiment of the present invention. As shown in FIG. 9, the base station includes a signaling transmitter 901 and an information receiver 902;

wherein, the signaling transmitter 901 is configured to transmit an indication signaling to user equipment, the indication signaling including identification information for triggering report of aperiodic channel state information; and the information receiver 902 is configured to receive channel state information reported by the user equipment, the channel state information being obtained by the user equipment according to a measurement set determined on the basis of the identification information.

In an embodiment, the signaling transmitter 901 is further configured to transmit a high-layer signaling to the user equipment, the high-layer signaling including corresponding relationship between the identification information and the measurement set.

It can be seen from the above embodiment that with the indication signaling for triggering the report of aperiodic channel state information, the needed aperiodic CSI may be quickly fed back via the DCI signaling, and the configuration of the reported set may be changed via RRC, thereby achieving relatively flexible aperiodic report.

An embodiment of the present invention further provides a computer-readable program, wherein when the program is executed in user equipment, the program enables a computer to carry out the method for reporting channel state information as described above in the user equipment.

An embodiment of the present invention further provides a storage medium in which a computer-readable program is stored, wherein the computer-readable program enables a computer to carry out the method for reporting channel state information as described above in user equipment.

An embodiment of the present invention further provides a computer-readable program, wherein when the program is executed in a base station, the program enables a computer to carry out the method for reporting channel state information as described above in the base station.

An embodiment of the present invention further provides a storage medium in which a computer-readable program is stored, wherein the computer-readable program enables a computer to carry out the method for reporting channel state information as described above in a base station.

The above apparatuses and methods of the present invention may be implemented by hardware, or by hardware in combination with software. The present invention relates to such a computer-readable program that when the program is executed by a logic device, the logic device is enabled to carry out the apparatus or components as described above, or to carry out the methods or steps as described above. The present invention also relates to a storage medium for storing the above program, such as a hard disk, a floppy disk, a CD, a DVD, and a flash memory, etc.

The present invention is described above with reference to particular embodiments. However, it should be understood by those skilled in the art that such a description is illustrative only, and not intended to limit the protection scope of the present invention. Various variants and modifications may be made by those skilled in the art according to the spirits and principle of the present invention, and such variants and modifications fall within the scope of the present invention.

What is claimed is:

1. A method for reporting channel state information in a Coordinated multipoint (CoMP) scheme, comprising:

receiving, by a user equipment, a Radio Resource Control (RRC) signaling transmitted by a base station, the RRC signaling comprising measurement set information associated with identification information, and when the identification information is two bits, the RRC signaling comprising measurement set information associated with identification information "01", "10" and "11" respectively, the RRC signaling is used to change the association between measurement set information with the identification information "01", "10" and "11" when report of information needed to be changed based on a reporting signal;

receiving, by the user equipment, Downlink Control Information (DCI) transmitted by the base station, the DCI comprising identification information for triggering an aperiodic report of channel state information;

determining a measurement set to which the aperiodic report of the channel state information corresponds according to the identification information and the measurement set information associated with identification information, the measurement set configured to allow information on one or more transmission points of the user equipment from among all coordinated transmission points which correspond to the user equipment including a primary transmission point and a secondary transmission point within one same base station; and reporting corresponding channel state information to the base station according to the measurement set.

2. The method according to claim 1, wherein when the identification information is one bit, the determining a measurement set to which the report of the channel state information corresponds according to the identification information comprises:

configuring one or more transmission points from among all the transmission points to which the user equipment corresponds into the measurement set by a higher layer signaling.

3. The method according to claim 1, further comprising: receiving a second RRC signaling transmitted by the base station, the second RRC signaling comprising information to configure the measurement set as information on one or more transmission points from among all the transmission points to which the user equipment corresponds.

4. User equipment in a Coordinated multipoint (CoMP) scheme, comprising:

a signaling receiver, configured to receive a Radio Resource Control (RRC) signaling transmitted by a base station, the RRC signaling comprising measurement set information associated with identification information, and when the identification information is two bits, the RRC signaling comprising measurement set information associated with identification information "01", "10" and "11" respectively, the RRC signaling is used to change the association between measurement set information with the identification information "01", "10" and "11" when report of information needed to be changed based on a reporting signal;

the signaling receiver is further configured to receive Downlink Control Information (DCI) transmitted by the base station, the DCI comprising identification information for triggering an aperiodic report of channel state information;

a processing circuit configured to determine a measurement set to which the aperiodic report of the channel state information corresponds according to the identification information and the measurement set information associated with identification information, the measurement set configured to allow information on one or more transmission points of the user equipment from among all coordinated transmission points which correspond to the user equipment including a primary transmission point and a secondary transmission point within one same base station; and a transmitter configured to transmit corresponding channel state information to the base station according to the measurement set.

5. The user equipment according to claim 4, wherein when the identification information is one bit, the processing circuit is configured to configure one or more transmission points from among all the transmission points to which the user equipment corresponds into the measurement set by a higher layer signaling.

6. The user equipment according to claim 4, wherein the signaling receiver is further configured to receive a second RRC signaling transmitted by the base station, the second RRC signaling comprising information to configure the measurement set as information on one or more transmission points from among all the transmission points to which the user equipment corresponds.

7. A base station in a Coordinated multipoint (CoMP) scheme, comprising:

a signaling transmitter, configured to transmit Radio Resource Control (RRC) signaling to a user equipment, the RRC signaling comprising measurement set information associated with identification information, and when the identification information is two bits, the RRC signaling comprising measurement set information associated with identification information "01", "10" and "11" respectively, the RRC signaling is used to change the association between measurement set information with the identification information "01", "10" and "11" when report of information needed to be changed based on a reporting signal;

the signaling transmitter is further configured to transmit Downlink Control Information (DCI) to the user equipment, the DCI comprising identification information for triggering an aperiodic report of channel state information, the identification information indicates a measurement set configured to allow information on one or more transmission points of the user equipment from among all coordinated transmission points which correspond to the user equipment including a primary transmission point and a secondary transmission point within one same base station; and an information receiver, configured to receive channel state information reported by the user equipment, the channel state information being obtained by the user equipment according to the measurement set determined on the basis of the identification information and the measurement set information associated with identification information.

8. The base station according to claim 7, wherein the signaling transmitter is further configured to transmit a second RRC signaling to the user equipment, the second RRC signaling comprising information to configure the measurement set as information on one or more transmission points from among all the transmission points to which the user equipment corresponds.

9. User equipment in a Coordinated multipoint (CoMP) scheme, comprising:
- a signaling receiver, configured to receive a Radio Resource Control (RRC) signaling transmitted by a base station, the RRC signaling comprising measurement set information associated with identification information, and when the identification information is two bits, the RRC signaling comprising measurement set information associated with identification information "01", "10" and "11" respectively, the RRC signaling is used to change the association between measurement set information with the identification information "01," "10" and "11" when report of information needed to be changed based on a reporting signal;
- the signaling receiver is further configured to receive Downlink Control Information (DCI) transmitted by the base station, the DCI comprising identification information for triggering an aperiodic report of channel state information; and
- a processing circuit configured to:
- determine a measurement set to which the aperiodic report of the channel state information corresponds according to the identification information and the measurement set information associated with identification information, the measurement set configured to allow information on one or more transmission points of the user equipment from among all coordinated transmission points which correspond to the user equipment including a primary transmission point and a secondary transmission point within one same base station; and
- report corresponding channel state information to the base station according to the measurement set.

10. The user equipment according to claim 9, wherein the signaling receiver is further configured to receive a second RRC signaling transmitted by the base station, the second RRC signaling comprising information to configure the measurement set as information on one or more transmission points from among all the transmission points to which the user equipment corresponds.

11. A base station in a Coordinated multipoint (CoMP) scheme, comprising:
- a transmitter;
- a receiver; and
- a processing circuitry to provide Radio Resource Control (RRC) signaling, the RRC signaling comprising measurement set information associated with identification information, and when the identification information is two bits, the RRC signaling comprising measurement set information associated with identification information "01", "10" and "11" respectively, the RRC signaling is used to change the association between measurement set information with the identification information "01," "10" and "11" when report of information needed to be changed based on a reporting signal,
- the transmitter configured to transmit the RRC signaling provided by the processing circuitry to a user equipment,
- the processing circuitry further configured to provide identification information for triggering an aperiodic report of channel state information, the identification information indicates a measurement set configured to allow information on one or more transmission points of the user equipment from among all coordinated transmission points which correspond to the user equipment including a primary transmission point and a secondary transmission point within one same base station,
- the transmitter further configured to transmit a signal comprising the identification information provided by the processing circuitry; and
- the receiver configured to receive channel state information reported by the user equipment, the channel state information being obtained by the user equipment according to a measurement set determined on the basis of the identification information and the measurement set information associated with identification information.

12. The base station according to claim 11, wherein the processing circuitry is further configured to instruct the transmitter to transmit a second RRC signaling to the user equipment, the second RRC signaling comprising information to configure the measurement set as information on one or more transmission points from among all the transmission points to which the user equipment corresponds.

* * * * *